(12) United States Patent
Wang et al.

(10) Patent No.: US 8,467,181 B2
(45) Date of Patent: Jun. 18, 2013

(54) FIXING MECHANISM FOR FIXING A PORTABLE DEVICE AND RELATED COMPUTER SYSTEM

(75) Inventors: Jo-Chiao Wang, New Taipei (TW); Cheng Tu, New Taipei (TW)

(73) Assignee: Aopen Inc., Xizhi Dist., New Taipei (TW)

( * ) Notice: Subject to any disclaimer, the term of this patent is extended or adjusted under 35 U.S.C. 154(b) by 278 days.

(21) Appl. No.: 13/085,485

(22) Filed: Apr. 13, 2011

(65) Prior Publication Data

US 2011/0249398 A1 Oct. 13, 2011

(30) Foreign Application Priority Data

Apr. 13, 2010 (TW) .............................. 99111463 A

(51) Int. Cl.
*G06F 1/16* (2006.01)
(52) U.S. Cl.
USPC ............... 361/679.37; 361/679.33; 361/727; 312/223.2; 312/334.17; 312/334.18
(58) Field of Classification Search
USPC ................................................... 361/679.39
See application file for complete search history.

(56) References Cited

U.S. PATENT DOCUMENTS

| | | | | |
|---|---|---|---|---|
| 5,262,923 A | * | 11/1993 | Batta et al. | 361/679.37 |
| 6,478,466 B1 | * | 11/2002 | Chang et al. | 384/49 |
| 7,623,345 B2 | * | 11/2009 | Shih | 361/679.58 |
| 7,701,721 B2 | | 4/2010 | Lin | |
| 8,159,817 B2 | * | 4/2012 | Lin et al. | 361/679.39 |
| 2005/0062378 A1 | * | 3/2005 | Wojcik | 312/332.1 |

FOREIGN PATENT DOCUMENTS

| | | |
|---|---|---|
| CN | 2480891 Y | 3/2002 |
| CN | 2665795 Y | 12/2004 |
| TW | 532497 | 5/2003 |
| TW | 573925 | 1/2004 |
| TW | M320288 | 10/2007 |
| TW | 200943031 | 10/2009 |

OTHER PUBLICATIONS

Office action mailed on Jul. 4, 2012 for the China application No. 201010156078.4, p. 3 line 4-18.
Office action mailed on Dec. 21, 2012 for the Taiwan application No. 099111463, filing date: Apr. 13, 2010, p. 1 line 5~14, p. 2~4 and p. 5 line 1~24.

* cited by examiner

*Primary Examiner* — Anthony Q Edwards
(74) *Attorney, Agent, or Firm* — Winston Hsu; Scott Margo

(57) ABSTRACT

A fixing mechanism for fixing a portable device includes a casing. A track is disposed on the casing for guiding the portable device to slide. At least one hole is formed on the casing. The fixing mechanism further includes at least one spherical component installed inside the hole on the casing for wedging into a sunken part on the portable device so as to fix the portable device inside the casing. The fixing mechanism further includes a resilient component installed on a side of the casing and the spherical component for providing resilient force to the spherical component so as to push the spherical component to wedge into the sunken part on the portable device.

10 Claims, 5 Drawing Sheets

FIXING MECHANISM FOR FIXING A PORTABLE DEVICE AND RELATED COMPUTER SYSTEM

BACKGROUND OF THE INVENTION

1. Field of the Invention

The present invention relates to a fixing mechanism for fixing a portable device and a related computer system, and more particularly, to a fixing mechanism utilizing a spherical component to fix a portable device and a related computer system.

2. Description of the Prior Art

Computers need to be taken apart when replacing broken components or upgrading components inside the computers. However, it is often inconvenient for users to disassemble a storage device. such as a hard disk, from a computer. Therefore, mechanical design for the computer capable of being disassembled easily is necessary.

Please refer to FIG. 1. FIG. 1 is a diagram of a computer mechanism 10 in the prior art. The computer mechanism 10 includes a casing 11, a power supply 12 disposed on a right rear side of the casing 11, a fixing frame 13 disposed on a right front side of the casing 11 for fixing an optical disk drive, and a fixing frame 14 disposed under the fixing frame 13 for fixing a hard disk. A plurality of fixing holes 17 is formed on two sides (a right side and a left side) of the fixing frame 14. A hard disk 15 can be installed into the casing 11 through a front side, a rear side, or an upper side of the casing 11. A plurality of screwing holes 16 is formed on two sides (a right side and a left side) of the hard disk 15, and the hard disk 15 can be fixed on the fixing frame 14 by utilizing screws to pass through the screwing holes 16 and the fixing holes 17.

When disassembling the hard disk 15, the hard disk 15 has to be disassembled after disassembling an optical disk drive and the screws from the two sides of the fixing frame 14. Due to limited space of the computer mechanism 10, it is difficult to disassemble the hard disk 15. For example, if the hard disk is installed into the casing 11 through the rear side of the computer mechanism, the power supply 12 has to be disassembled before disassembling the hard disk. Therefore, it is difficult to fix the hard disk on the casing via the screws within the limited space inside the casing no matter whereinto the hard disk is installed.

There are a lot of conventional mechanical designs of the portable storage device for solving the above-mentioned drawbacks. For example, a conventional portable storage device with convenient assembly is disclosed in TW patent no. 1259449, which is for increasing assembly efficiency of the portable storage device and simplifying disassembly of the portable storage device. However, the conventional portable storage device needs screws for connecting the components of the portable storage device. The conventional portable storage device has complicated assembly, and the complicated assembly spends working hours.

SUMMARY OF THE INVENTION

The present invention provides a fixing mechanism for fixing a portable device and a related computer system for solving above drawbacks.

According to the claimed invention, a fixing mechanism includes a casing whereon a track is disposed. The track is for guiding a portable device to slide, and at least one opening is formed on the casing. The fixing mechanism further includes at least one spherical component disposed inside the opening on the casing for wedging inside a sunken part of the portable device so as to fix the portable inside the casing, and a resilient component installed on a side of the casing and the spherical component for providing resilient force to the spherical component so as to push the spherical component to wedge inside the sunken part of the portable device.

According to the claimed invention, at least one positioning component is for passing through the resilient component and inserting into the casing so as to fix the resilient component on the casing.

According to the claimed invention, the resilient component comprises a hook structure for wedging inside a hole on the casing.

According to the claimed invention, the casing further includes at least one blocking component for blocking a side of the portable device when the portable device is installed inside the casing.

According to the claimed invention, the spherical component is a ball bearing.

According to the claimed invention, a computer system includes a portable device whereon at least one sunken part is formed, and a fixing mechanism for fixing the portable device. The fixing mechanism includes a casing whereon a track is disposed. The track is for guiding the portable device to slide, and at least one opening is formed on the casing. The fixing mechanism further includes at least one spherical component disposed inside the opening on the casing for wedging inside the sunken part of the portable device so as to fix the portable inside the casing, and a resilient component installed on a side of the casing and the spherical component for providing resilient force to the spherical component so as to push the spherical component to wedge inside the sunken part of the portable device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
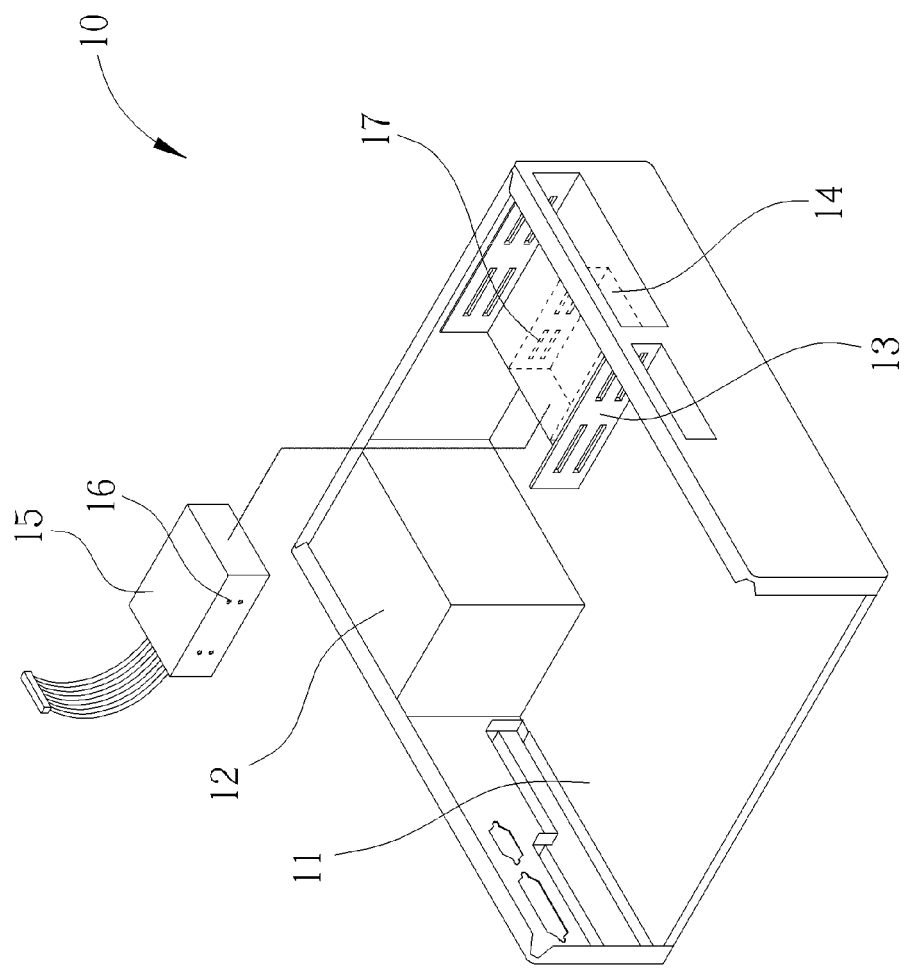
FIG. 1 is a diagram of a computer mechanism in the prior art.
Figure 2:
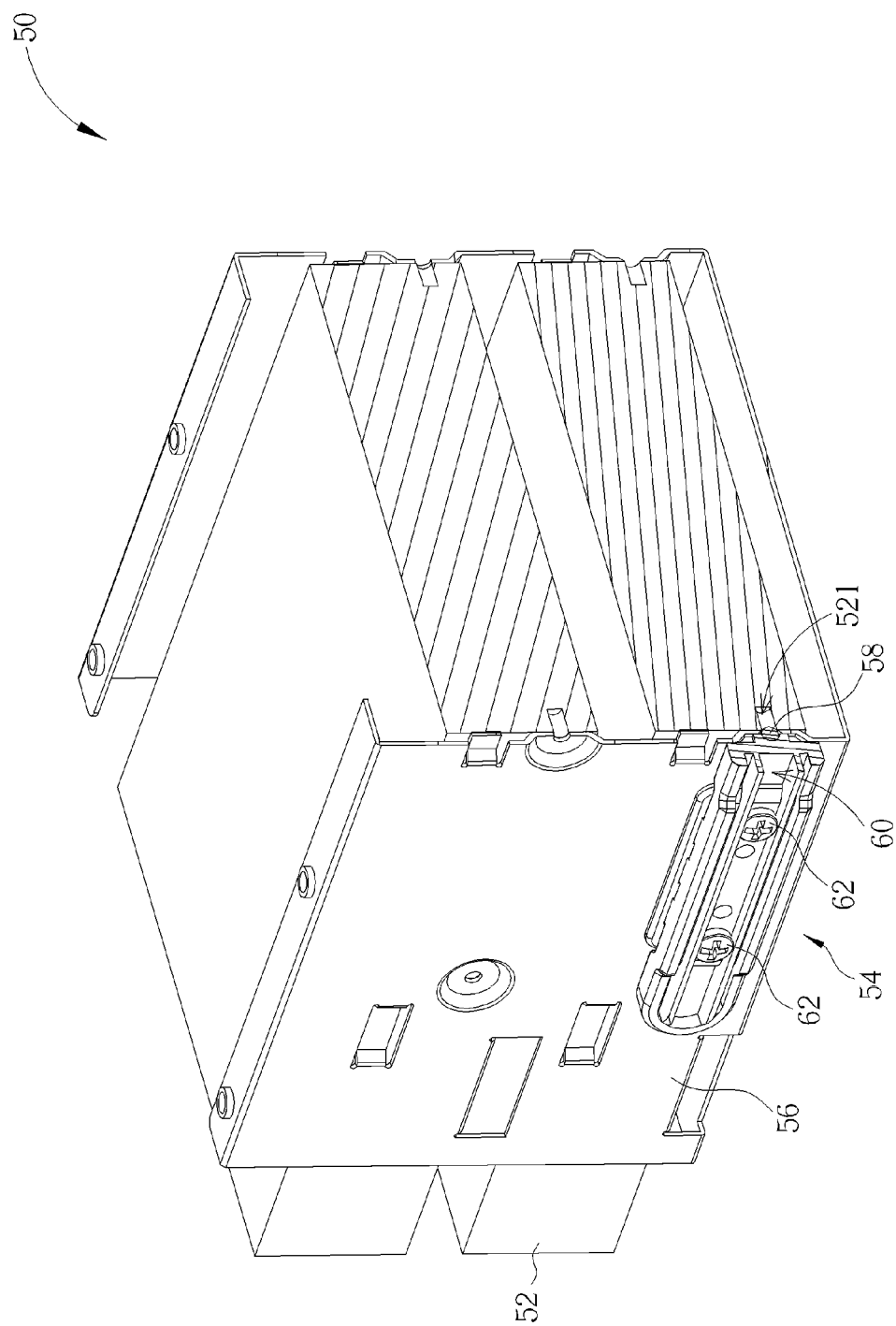
FIG. 2 is a diagram of a computer system according to a preferred embodiment of the present invention.
Figure 3:
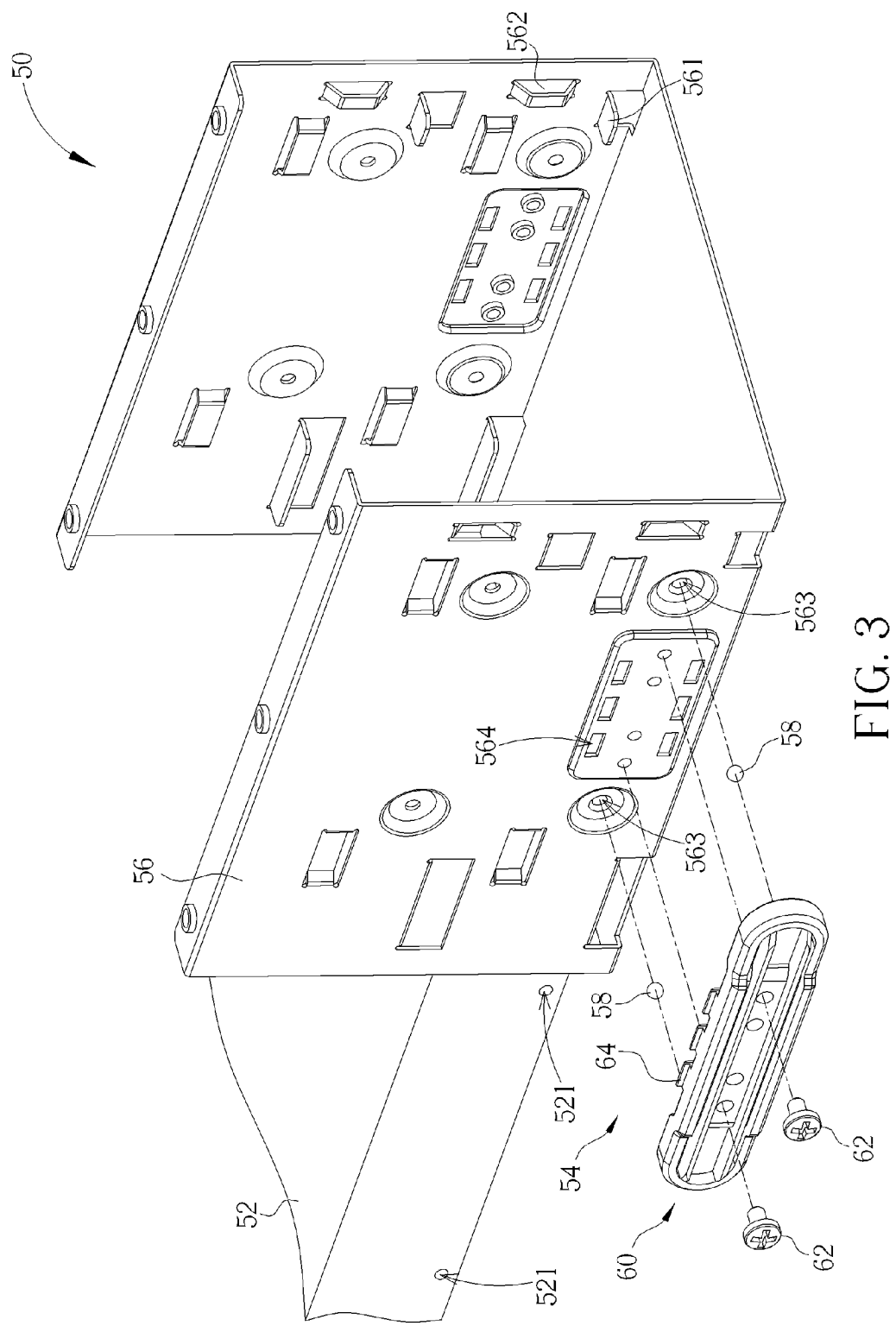
FIG. 3 is an exploded diagram of the computer system according to the preferred embodiment of the present invention.

Please refer to FIG. 2 and FIG. 3. FIG. 2 is a diagram of a computer system 50 according to a preferred embodiment of the present invention. FIG. 3 is an exploded diagram of the computer system 50 according to the preferred embodiment of the present invention. Parts of internal structure of the computer system 50 are omitted in FIG. 2 for illustrating the computer system 50 clearly. The computer system 50 can be a desktop computer system. The computer system 50 includes at least one portable device 52. The portable device 52 can be a hard disk, an optical disk drive, and so on. At least one sunken part 521, such as a hole, is formed on the portable device 52. The computer system 50 further includes a fixing mechanism 54 for fixing the portable device 52. The fixing mechanism 54 includes a casing 56 whereon at least one track 561 is disposed. The track 561 is for guiding the portable device 52 to slide relative to the casing 56, so that the portable device 52 can be drawn out of the casing 56 easily. The casing 56 further includes a blocking component 562 for blocking a side of the portable device 52 when the portable device 52 is installed inside the casing 56, so as to position the portable device 52. In addition, at least one opening 563 and at least one hole 564 are formed on the casing 56.

The fixing mechanism 54 further includes at least one spherical component 58 installed inside the opening 563 on the casing 56. The spherical component 58 can be made of metal material. For example, the spherical component 58 can be a ball bearing. The spherical component 58 is for wedging inside the sunken part 521 of the portable device 52, so as to fix the portable device 52 inside the casing 56. The number and the position of the spherical component 58 are not limited to the above-mentioned embodiment, and it depends on actual demand. The fixing mechanism 54 further includes a resilient component 60 installed on a side of the casing 52 and the spherical component 58 for contacting the spherical component 58 and for providing a resilient force to the spherical component 58, so as to push the spherical component 58 to wedge inside the sunken part 521 of the portable device 52. In addition, in order to fix the resilient component 60 on the side of the casing 60, the fixing mechanism 54 further includes at least one positioning component 62 for passing through the resilient component 60 and inserting into the casing 56, so as to fix the resilient component 60 on the casing 52. The positioning component 62 can be a pin. In this embodiment, two positioning components 62 are for fixing the resilient component 60 on the casing 52. The larger distance is set between the two positioning components 62, and the larger moment of the two positioning components is generated accordingly. Therefore, the resilient force forced on the spherical component 58 by the resilient component 60 corresponds to the distance between the two positioning components 62. The present invention can adjust the resilient force forced on the spherical component 58 by the resilient component 60 by varying the distance between the two positioning components 62. The number and the position of the positioning component 62 are not limited to the above-mentioned embodiment, and it depends on actual demand. The resilient component 60 can include a hook structure 64 for wedging inside the hole 564 on the casing 56 so as to fix the resilient component 60 on the casing 56 with the positioning component 62.

Figure 4:
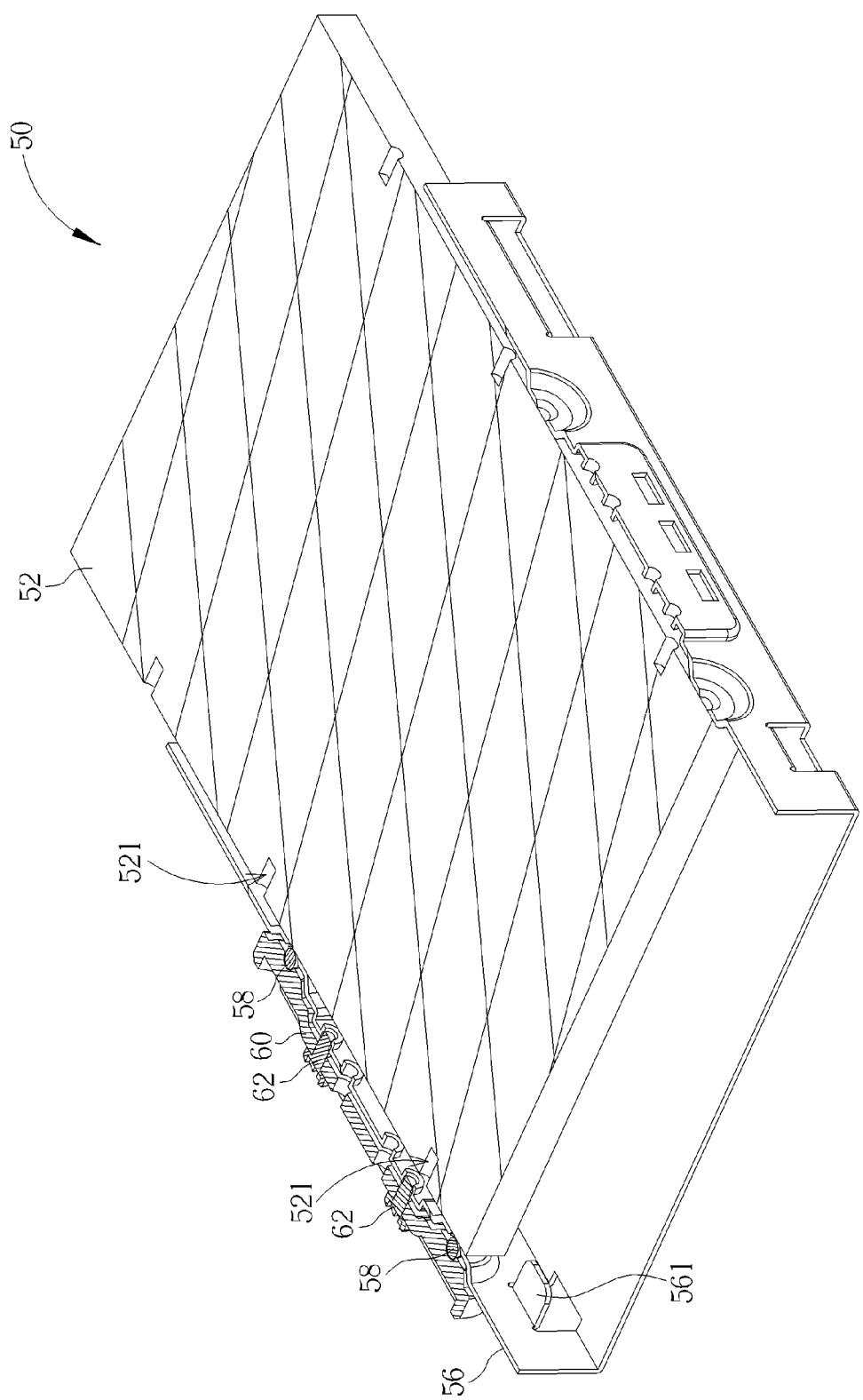
FIG. 4 is a sectional view of a spherical component not fixed on a portable device according to the preferred embodiment of the present invention.
Figure 5:
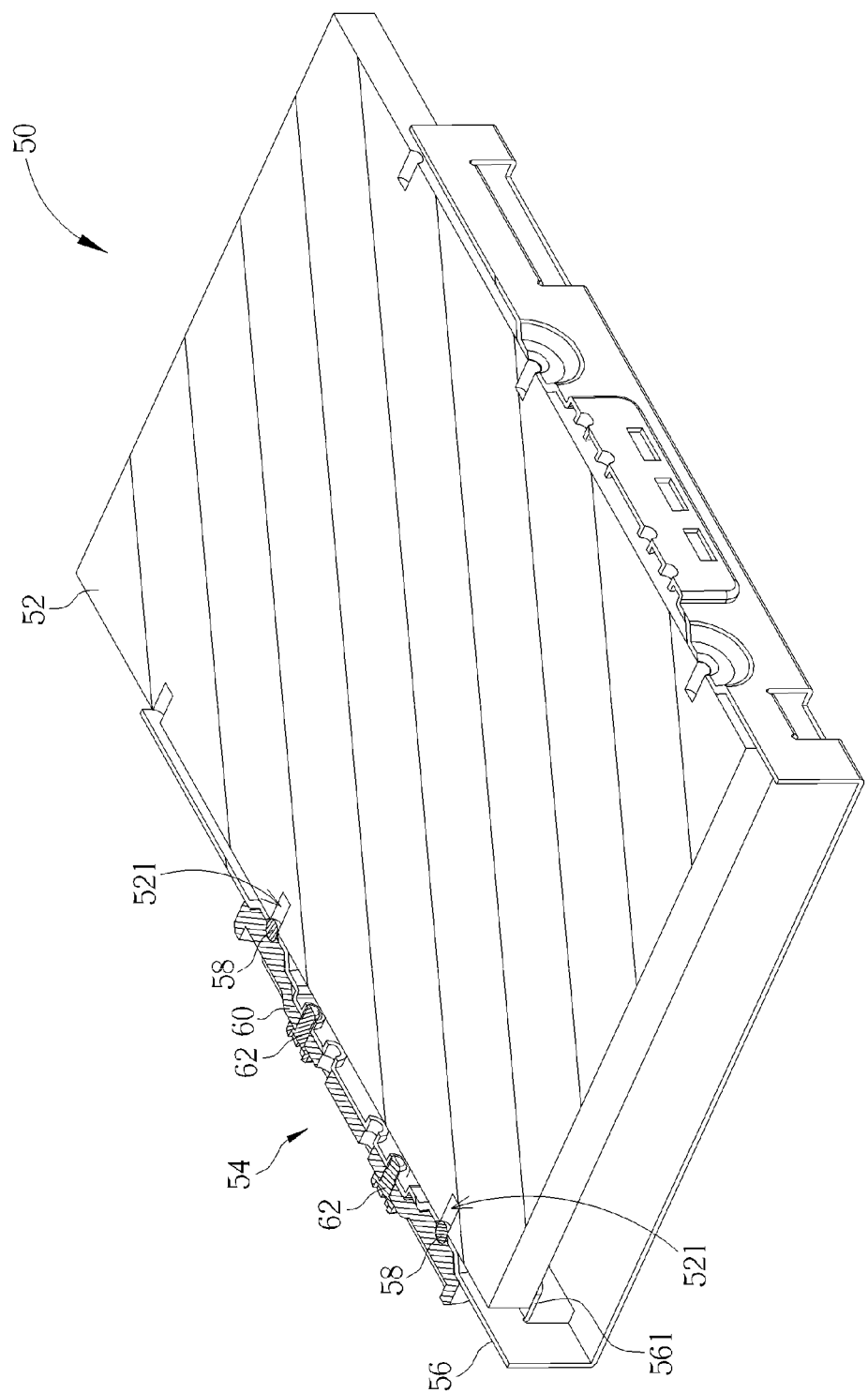
FIG. 5 is a sectional view of the spherical component fixed on the portable device according to the preferred embodiment of the present invention.

Please refer to FIG. 2 to FIG. 5. FIG. 4 is a sectional view of the spherical component 58 not fixed on the portable device 52 according to the preferred embodiment of the present invention. FIG. 5 is a sectional view of the spherical component 58 fixed on the portable device 52 according to the preferred embodiment of the present invention. As shown in FIG. 4, when the portable device 52 is pushed into the casing 56 and the spherical component 58 is not fixed inside the sunken part 521 of the portable device 52, a lateral wall of the portable device 52 drives the spherical component 58 to push the resilient component 60. Because the resilient component 60 is made of resilient material, such as rubber and plastic material, the resilient component 60 can be deformed when being compressed by the spherical component 58. Meanwhile, the portable device 52 can be pushed in or pulled out freely. When the portable device 52 is pushed into the casing 56 completely and the sunken part 521 of the portable device 52 aligns with the spherical component 58, because the lateral wall of the portable device 52 does not push the spherical component 58 outwardly, the resilient component 60 provides a resilient recovering force to the spherical component 58, so as to push the spherical component 58 to wedge inside the sunken part 521 of the portable device 52 and to stably fix the portable device 52 inside the casing 56 as shown in FIG. 5. In the present invention, the blocking component 562 can block a side of the portable device 52 so as to position the portable device 52 when the spherical component 58 is wedged inside the sunken part 521 of the portable device 52. On the other hand, as the spherical component 58 is released from the portable device 52, the portable device 52 can be drawn out inversely. At this time, the lateral wall of the portable device 52 pushes the spherical component 58 outwardly, and the portable device 52 can be drawn out of the casing 56 freely.

Comparing to the prior art, the fixing mechanism for fixing the portable device of the present invention can improve the conventional drawbacks that assembly of the portable device is inconvenient and complicated. Because the fixing mechanism of the present invention does not utilizes screws, the assembly difficulty and the working hours of the present invention are decreased, so as to promote assembly convenience effectively.

Those skilled in the art will readily observe that numerous modifications and alterations of the device and method may be made while retaining the teachings of the invention.

What is claimed is:

1. A fixing mechanism comprising:
    a casing whereon a track is disposed, the track being for guiding a portable device to slide, and at least one opening being formed on the casing; and
    at least one spherical component disposed inside the opening on the casing for wedging inside a sunken part of the portable device so as to fix the portable device inside the casing; and
    a resilient component installed on a side of the casing and the spherical component for providing resilient force to the spherical component so as to push the spherical component to wedge inside the sunken part of the portable device.

2. The fixing mechanism of claim 1 further comprising:
    at least one positioning component for passing through the resilient component and inserting into the casing so as to fix the resilient component on the casing.

3. The fixing mechanism of claim 1, wherein the resilient component comprises a hook structure for wedging inside a hole on the casing.

4. The fixing mechanism of claim 1, wherein the casing further comprises at least one blocking component for blocking a side of the portable device when the portable device is installed inside the casing.

5. The fixing mechanism of claim 1, wherein the spherical component is a ball bearing.

6. A computer system comprising:
    a portable device whereon at least one sunken part is formed; and
    a fixing mechanism for fixing the portable device, the fixing mechanism comprising:
        a casing whereon a track is disposed, the track being for guiding the portable device to slide, and at least one opening being formed on the casing; and
        at least one spherical component disposed inside the opening on the casing for wedging inside the sunken part of the portable device so as to fix the portable device inside the casing; and
        a resilient component installed on a side of the casing and the spherical component for providing resilient force to the spherical component so as to push the spherical component to wedge inside the sunken part of the portable device.

7. The computer system of claim 6, wherein the fixing mechanism further comprises at least one positioning component for passing through the resilient component and inserting into the casing so as to fix the resilient component on the casing.

8. The computer system of claim 6, wherein the resilient component comprises a hook structure for wedging inside a hole on the casing.

9. The computer system of claim 6, wherein the casing further comprises at least one blocking component for blocking a side of the portable device when the portable device is installed inside the casing.

10. The computer system of claim 6, wherein the spherical component is a ball bearing.

* * * * *